Feb. 8, 1966   L. L. MASINI   3,234,063
METHOD OF FORMING A WOUND COIL OF FOIL AND INSULATING TAPE
Original Filed June 10, 1960   11 Sheets-Sheet 1

INVENTOR
LOUIS L. MASINI

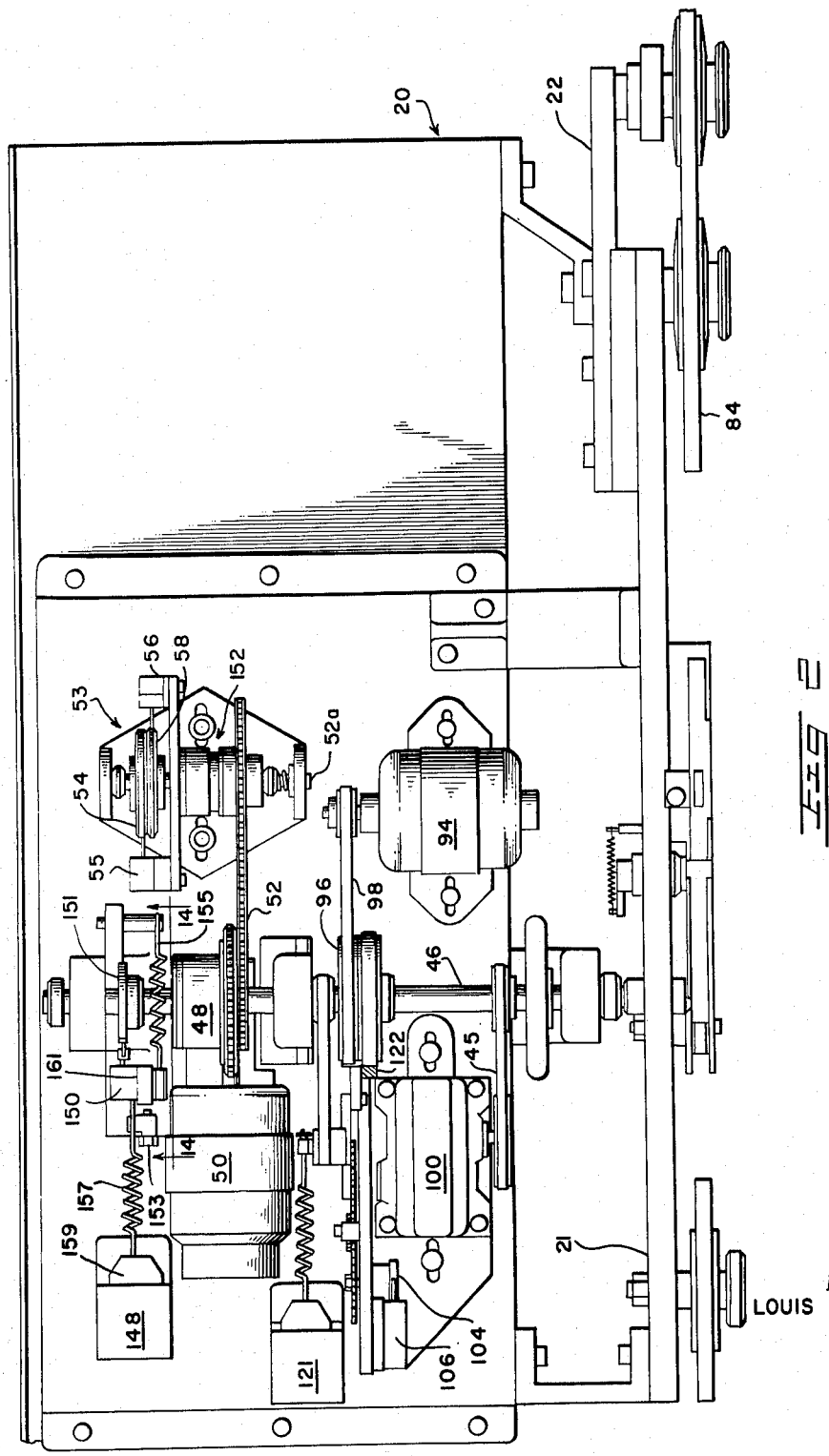

Feb. 8, 1966  L. L. MASINI  3,234,063
METHOD OF FORMING A WOUND COIL OF FOIL AND INSULATING TAPE
Original Filed June 10, 1960  11 Sheets-Sheet 3
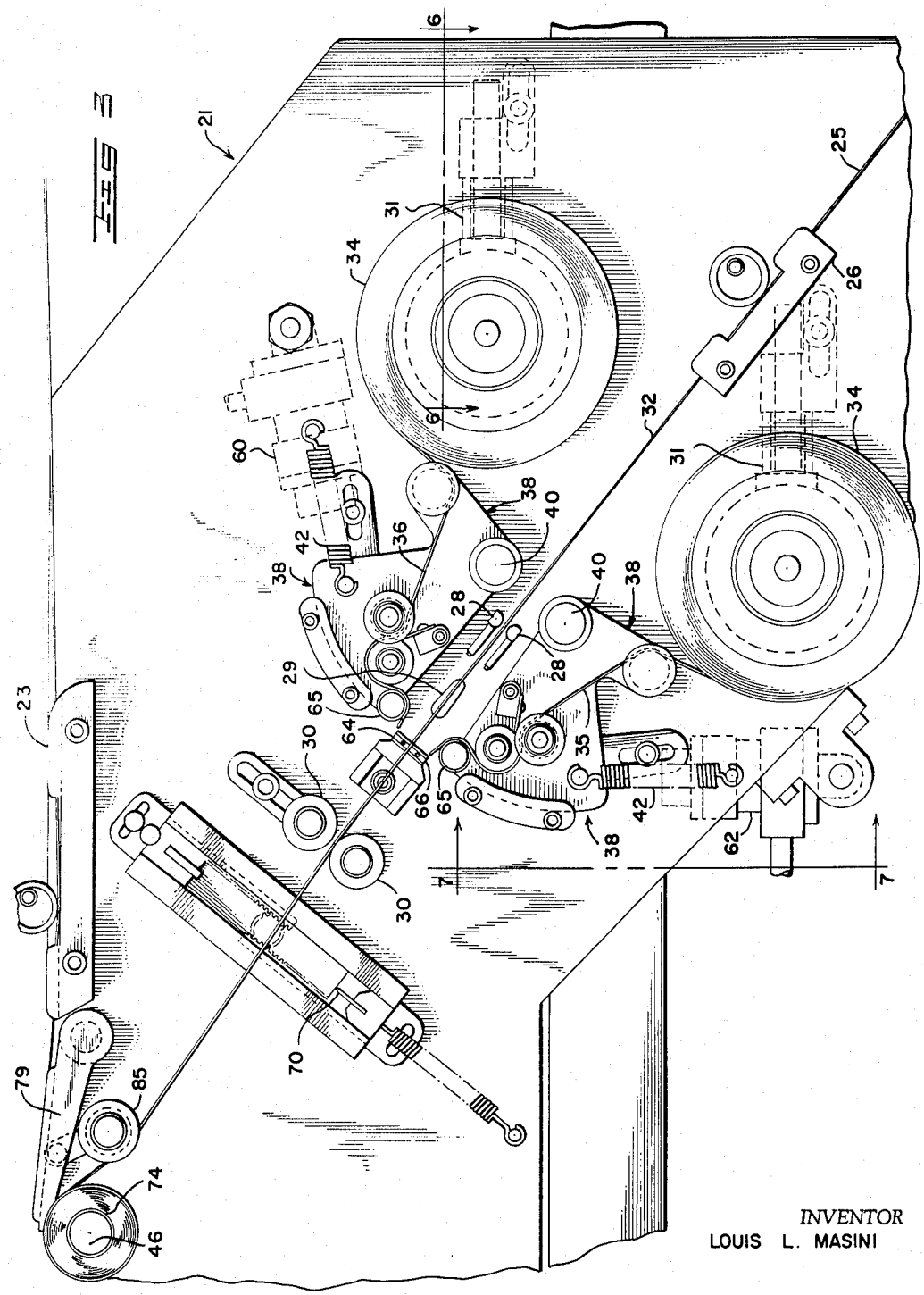
INVENTOR
LOUIS L. MASINI

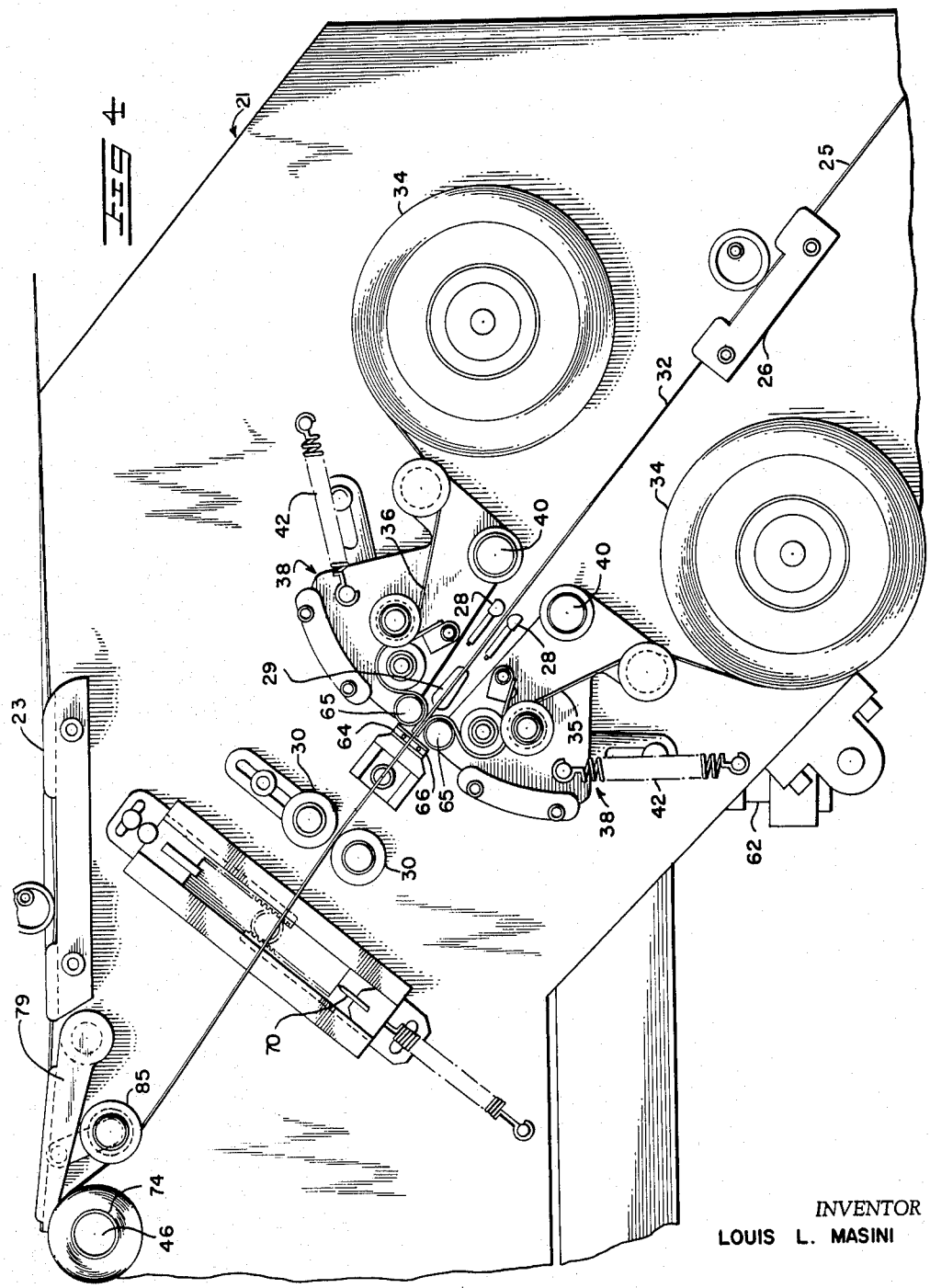

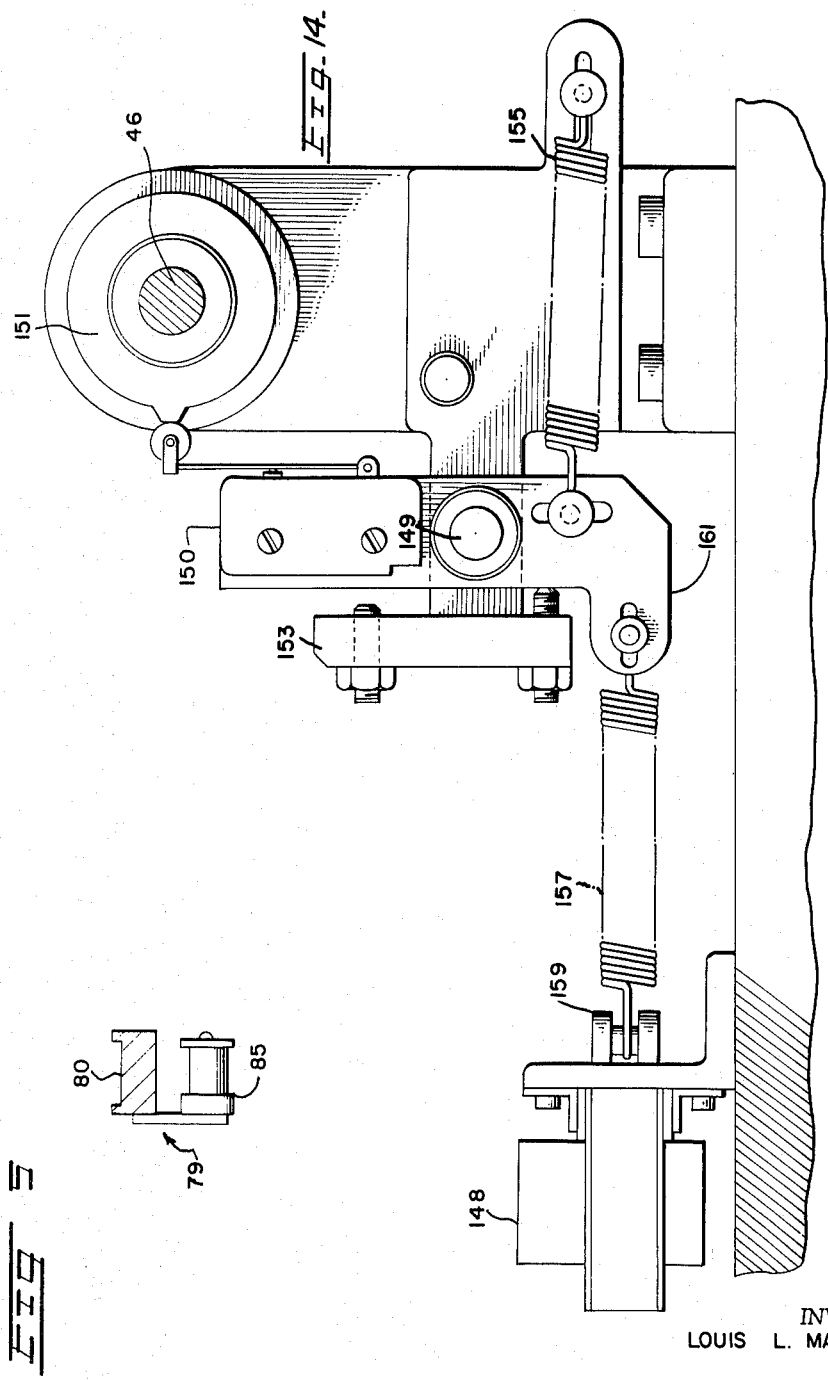

Feb. 8, 1966  L. L. MASINI  3,234,063
METHOD OF FORMING A WOUND COIL OF FOIL AND INSULATING TAPE
Original Filed June 10, 1960  11 Sheets-Sheet 6
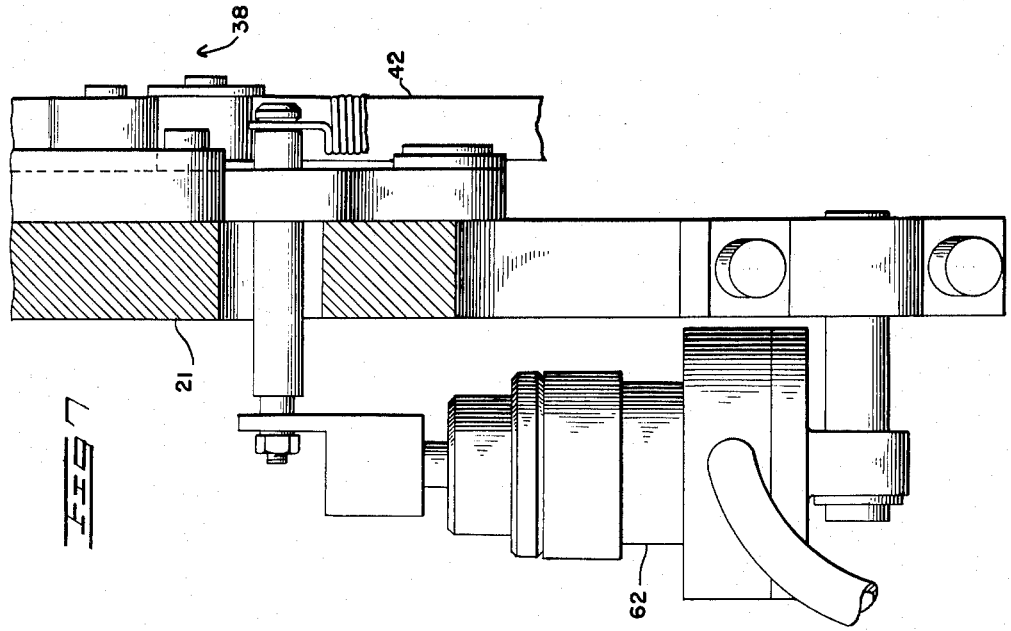
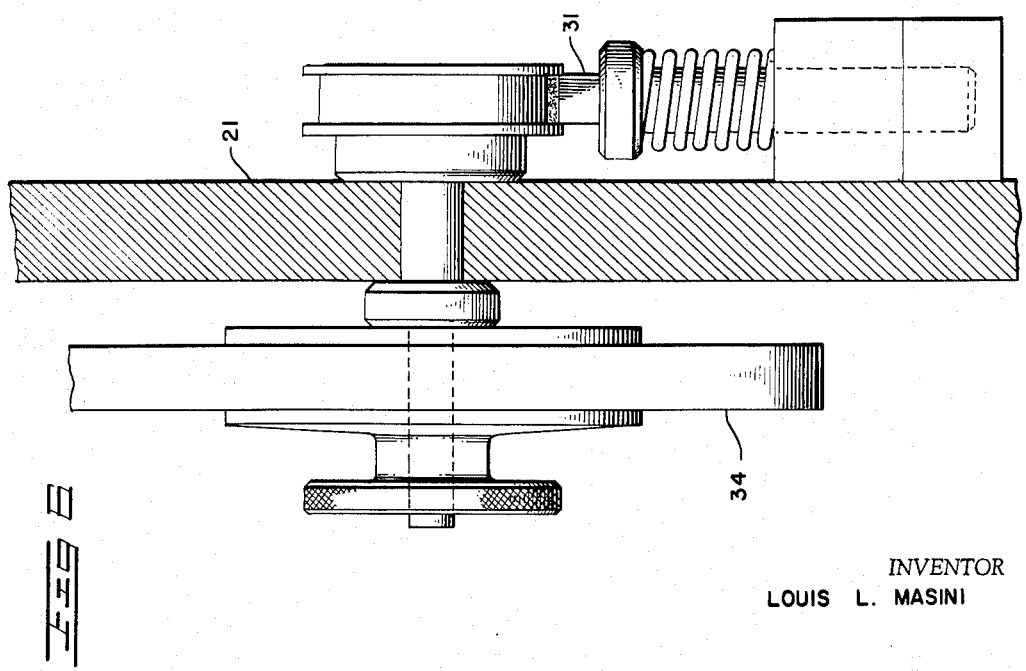
INVENTOR
LOUIS L. MASINI

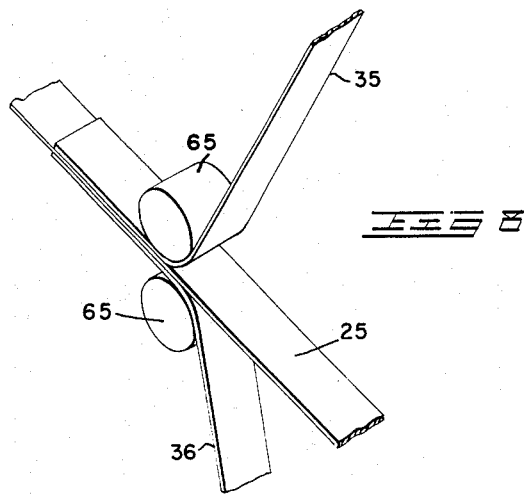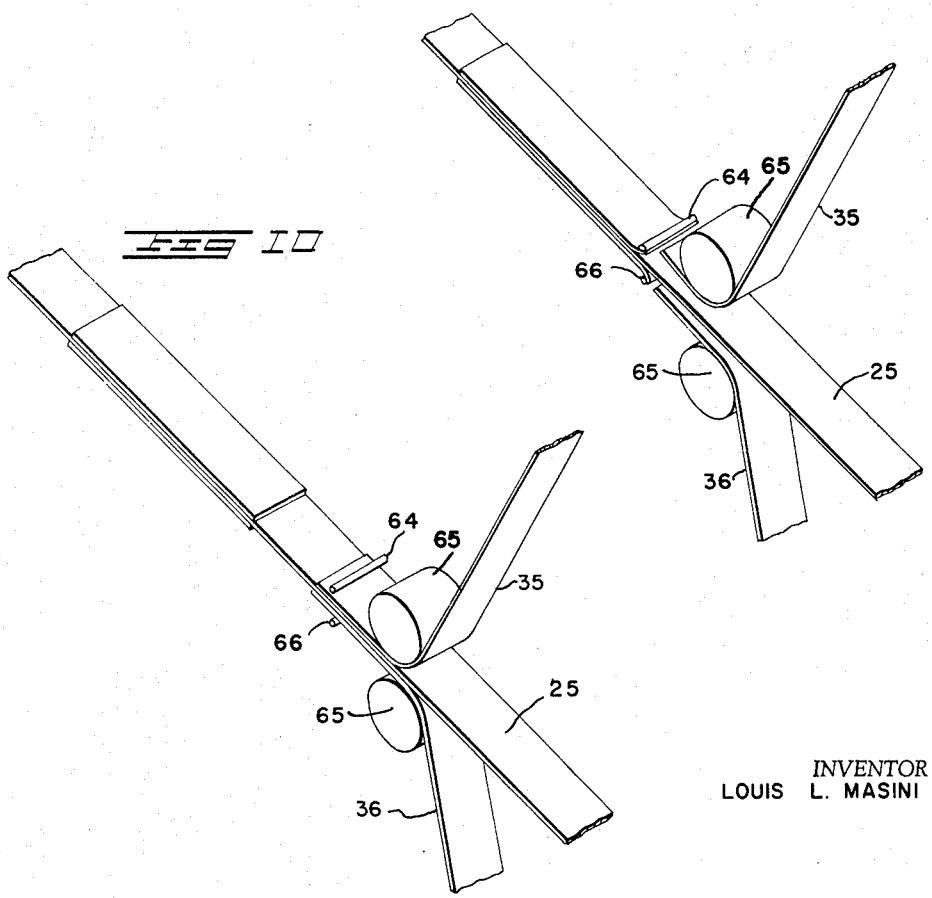

Feb. 8, 1966 L. L. MASINI 3,234,063
METHOD OF FORMING A WOUND COIL OF FOIL AND INSULATING TAPE
Original Filed June 10, 1960 11 Sheets-Sheet 8
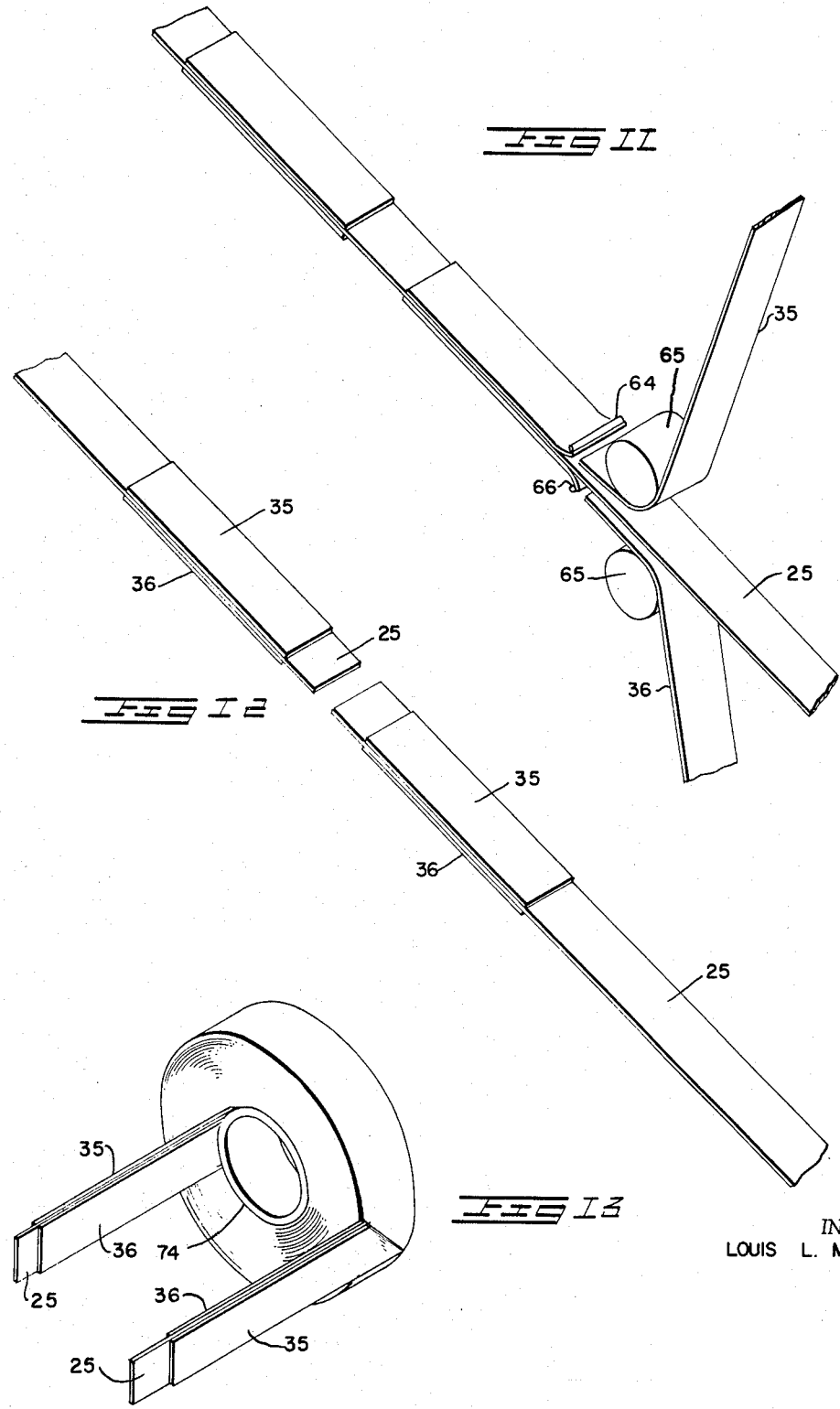
INVENTOR
LOUIS L. MASINI

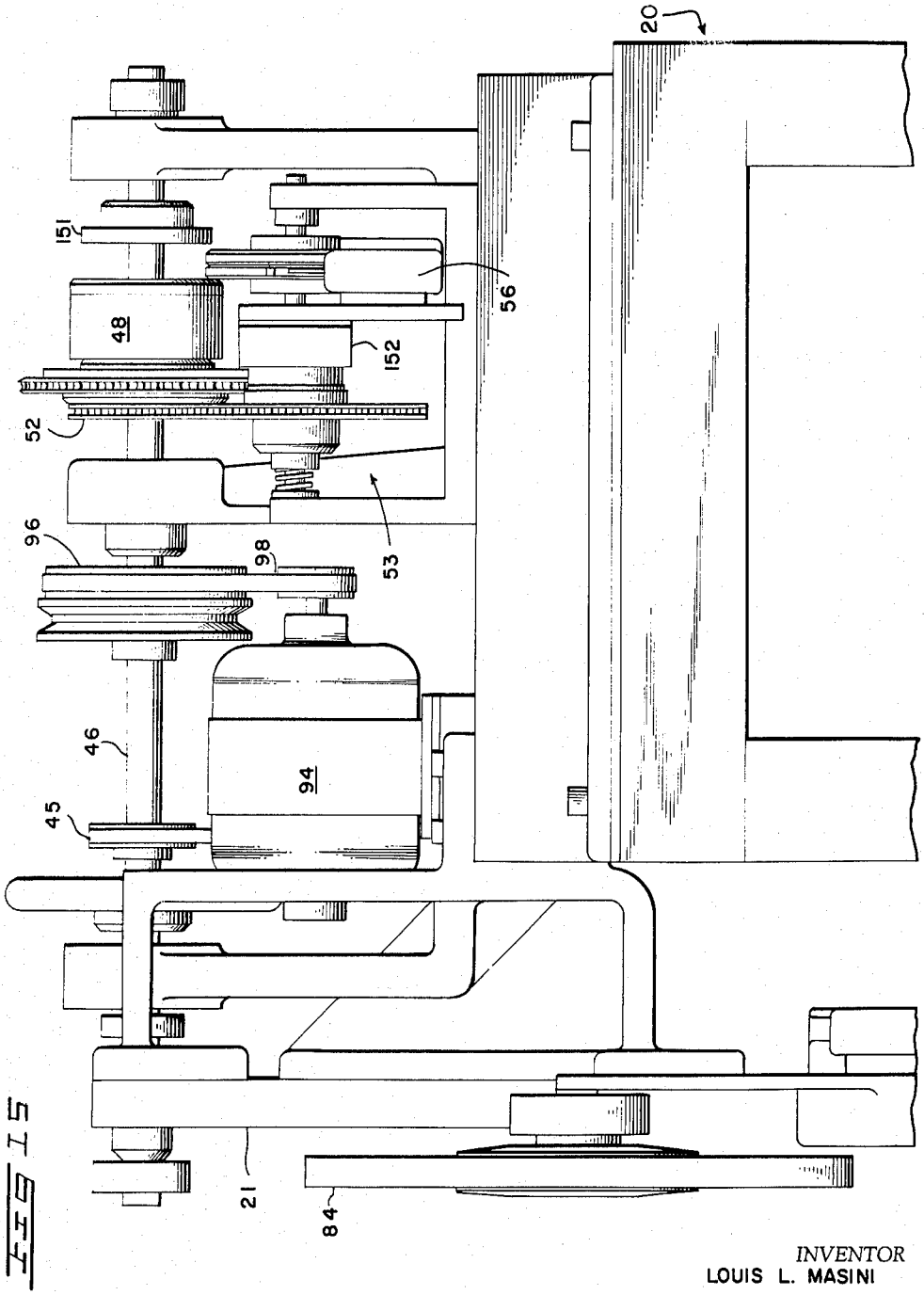

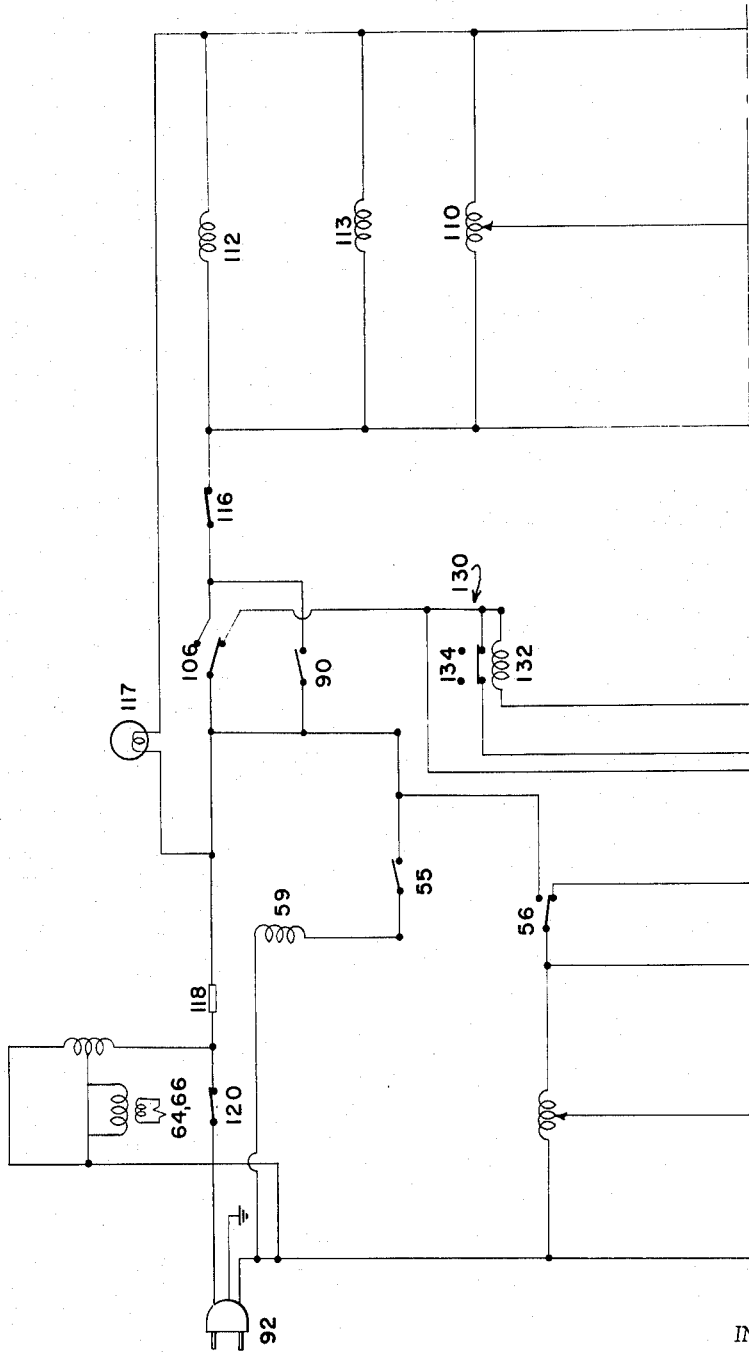

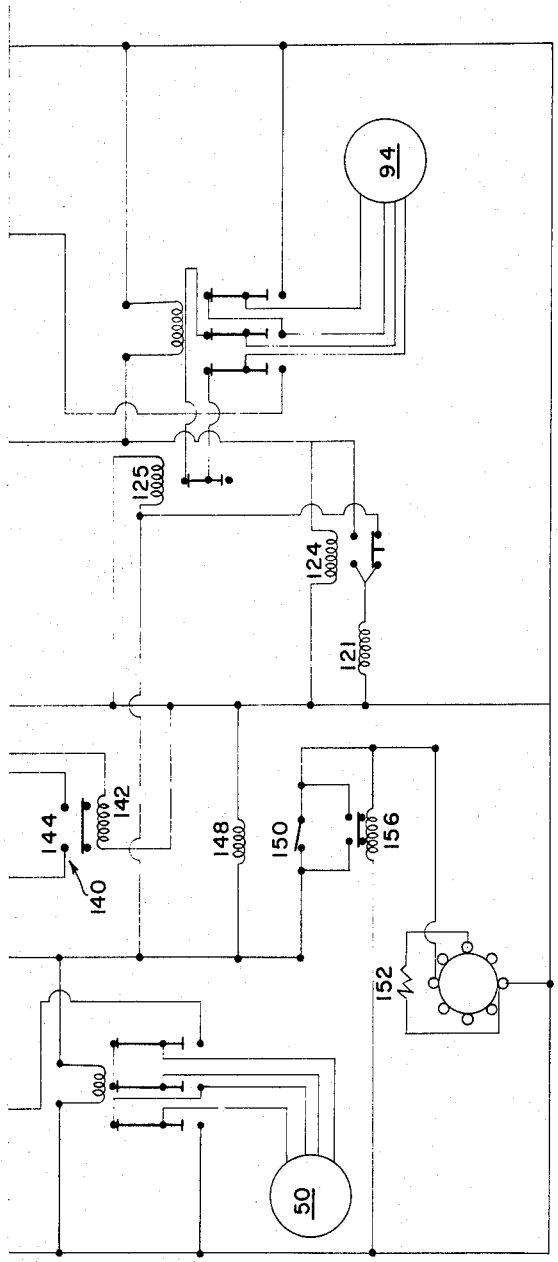

United States Patent Office 3,234,063
Patented Feb. 8, 1966

3,234,063
METHOD OF FORMING A WOUND COIL OF FOIL AND INSULATING TAPE
Louis L. Masini, Henrico County, Va., assignor to Reynolds Metals Company, Richmond, Va., a corporation of Delaware
Original application June 10, 1960, Ser. No. 35,244. Divided and this application May 31, 1962, Ser. No. 208,160
4 Claims. (Cl. 156—190)

This application is a division of copending application Serial No. 35,244, filed June 10, 1960.

The present invention relates to a coil winding machine and a method of forming a conjoint winding of a conductive strip and an insulating strip; and the invention particularly concerns an improved method of and apparatus for winding coil units of interleaved aluminum foil and paper.

While the prior art is replete with methods and machines for winding coils, certain difficulties are yet encountered in the present practices for winding metallic foil and a paper web. One problem is that variations in the lateral positioning of the foil with respect to the paper insulation tend to vary the electrical characteristics of the coil. Furthermore, if the metal foil of one turn comes in contact with the foil of another turn, the electrical path is short-circuited.

In addition, certain applications for such coils require very specific numbers of turns and closely controlled angular displacement of the coil leads. These requirements are somewhat opposed, since variations in the degree of tightness with which the coil turns are wound can affect the resulting displacement of leads.

Therefore, it becomes a problem how to orient the edges of moving metal foil and paper insulation, with respect to each other, by an automatic or semi-automatic machine capable of high speed operation. Likewise, it becomes a problem how to form the coil leads so that a predetermined position thereof may be assured.

Investigation has led to the discovery that the strips of metal foil and paper insulation forming turns of a coil may be guided in such a manner as to be centered accurately as they approach and are wound onto the hubs of the coil. Also, it has been found possible to orient one lead with respect to the other, while still producing a coil having a given number of turns.

These results are accomplished by providing a machine with independent winding and taping cycles, and a timing system for automatically coordinating their consecutive operation. An inner terminal lead is formed, and a coil is wound which has approximately the predetermined number of turns. The application of terminal tape to the foil strip is then controlled relative to the position of the inner terminal lead. By this means, the inner and outer terminal leads are established in the desired angular positions, irrespective of any variations in strip tension during the winding operation.

These, as well as further advantages which are inherent in the invention, will become apparent from the following description, reference being had to the accompanying drawings wherein:

FIGURE 2 is a top plan view of the coil winding machine;

FIGURE 3 is an enlarged elevation view of the central portion of the machine;

FIGURE 4 is a view similar to FIGURE 3, showing the operating of applying terminal tape;

FIGURE 5 is a cross-sectional view of guide arm 79, along line 5—5 of FIGURE 1;

Figure 1:
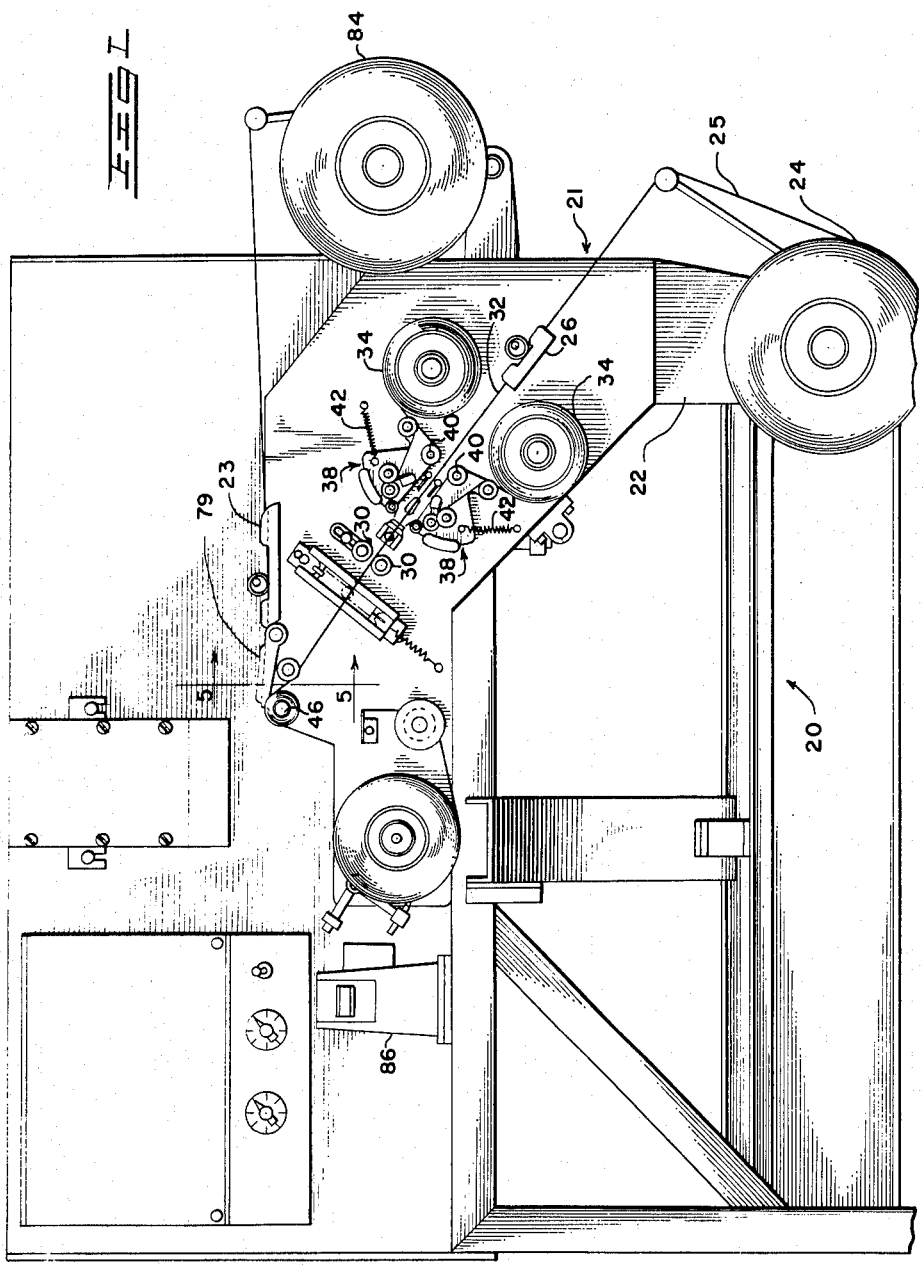
FIGURE 1 is a front elevation view of a coil winding machine in accordance with a preferred embodiment of the present invention.

FIGURES 6 and 7 are sectional views, respectively along lines 6—6 and 7—7 of FIGURE 3, showing details;

FIGURES 8–12 are schematic views of the tape applying sequence;

FIGURE 13 is a perspective view of a completed coil;

FIGURE 14 is a sectional view along line 14—14 of FIGURE 2;

FIGURE 15 is a side elevation of the upper portion of the machine; and

FIGURES 16$^a$ and 16$^b$ show an electrical circuit diagram of the control system.

Referring now to the drawings, particularly FIGURE 1, there is shown an angle iron table 20 which supports a front operating plate 21. Mounted below the operating plate and also in front of the angle iron table is a foil unwind plate 22, secured at one end to the operating plate and at the other end to the angle iron table.

On the foil unwind plate 22 there is mounted a foil unwind reel 24 which supplies a strip of metal foil 25, preferably of aluminum and having a width of, for example, 13/32 inch. The thickness of the aluminum foil may be typically from 0.0020 to 0.0028 inch.

A mechanical brake or biasing means (not shown) is coupled to the foil unwind reel, whereby the reel will not turn to unwind without a predetermined pull being applied to the external end of the foil strip. The external end of the foil is fed upwardly over a guide 26, thence threaded between two air jet studs 28, through foil guide 29, and then between a pair of upper pinch rollers 30.

Adjacent the guide 26, and along a path 32 of the foil 25, there are mounted on the operating plate 21 a pair of terminal tape reels or holders 34, which rotate in opposite directions as they unwind terminal tapes 35, 36 (see FIGURE 3). The terminal tapes are insulation tapes which may be slightly wider than the foil 25. The cohesive nature of the terminal tape provides that the tape does not freely unwind. In addition, mechanical brakes 31 are employed to prevent overrunning.

The outer ends of the tape are fed through respective tape rocker arm assemblies 38 mounted for pivoted movement about bracket studs 40 secured to the front operating plate. Pull strings 42 are shown for retaining the tape rocker arm assemblies in a remote position from the foil path 32. The surfaces of the terminal tapes facing the foil along the path 32 are held off of the foil by air jets that proceed from the tubes inserted in the studs 28, and air is directed substantially along the path of the forward direction of the foil.

A paper supply roll 84 is also provided with a tensioning system similar to that of foil reel 24. The paper on roll 84 may be kraft tissue paper. Guide means 23 controls the movement of the paper insulation. The relative lateral positioning of the foil and paper is closely controlled by guide arm 79.

Operation of the machine may be conveniently discussed in two stages, the winding cycle and the taping cycle. In both cycles of operation, the foil and paper are advanced by rotation of shaft 46 and a core member 74 to which they are attached. However, separate drives are employed for the two cycles.

*The taping cycle*

During taping operations, tape cycle motor 50 (FIGURE 2) drives the shaft 46 through a worm on the motor shaft and a worm gear and overrunnning clutch 48 on the shaft 46. The clutch transmits torque to the shaft 46 during the taping cycle, but is otherwise disengaged from the shaft.

When the tape cycle motor 50 develops torque in the shaft 46, a chain and sprocket coupling 52 rotates a tape cycle shaft 52a of the tape cycle unit 53 through a magnetic clutch 152. As will be explained hereinafter, magnetic clutch 152 is energized to connect tape cycle motor 50 in driving relation to tape cycle unit 53 under control of tape angle switch 150 and cam 151 (FIG. 14) so that the tape cycle control unit 53 begins operation at a predetermined angular position of shaft 46, to thereby establish a predetermined angular relation between the inner terminal tape and the outer terminal tape on a given coil, as will be explained hereinafter.

The tape cycle unit 53 includes cams 54 and 58 which are rotated by tape cycle shaft 52a through clutch 152 as just described. Cam 58 controls the operation of switch 56 which is closed for nearly a complete revolution of the cam to maintain the circuit of motor 50 energized during the taping operation, and also to maintain hot wires 64, 66 energized during the taping portion of the cycle. Cam 54 control a terminal tape switch 55 which is actuated twice during each rotation of cam 54 to operate control valve solenoids 59 for tape air cylinders 60, 62.

The terminal tape air cylinders are coupled to the tape rocker arm assemblies 38 to rotate them toward the foil strip. In this manner (see FIGURE 4), the terminal tape is applied, in spaced lengths, to the moving foil as the foil is advanced by the rotation of the shaft 46. Each of the rocker arm assemblies 38 includes a roller member 65 beneath which the tape passes, the roller 65 being effective to press the tape into adhered engagement with the foil strip when the rocker arm assembly is moved toward the foil strip by tape air cylinders 60, 62. The foil and terminal tapes which are superposed on the foil then pass through pinch rollers 30 which apply pressure to insure that the tapes are firmly secured to the foil.

During a first interval that the terminal tape switch 55 energizes the cylinders for engaging the rocker arm assemblies, an outer insulated terminal lead is formed by the tapes 35, 36 upon application thereof to the foil. With the continued rotation of the shaft 46 by the motor 50 and the de-energization of the cylinders 60, 62 by action of the cam 54, the rocker arm assemblies are again remotely positioned to each other; and the terminal tapes are pulled against heated cutting elements such as terminal tape hot wires 64, 66 to sever the terminal tape being fed to the foil. The hot wires provide a fast, sharp severing or cut-off of the tapes. The air jets again maintain the terminal tape from the foil.

As the cylinders are again energized by the action of cam 54, the rocker arm assemblies are again rotated for applying the terminal tape to the foil to form an inner insulated terminal lead of tape on the moving foil. Again, the hot wires 64, 66 sever the terminal tape that is fed onto the foil as the rocker arm assemblies are removed to their initial position (FIGURE 3) and the air jets provide that the terminal tapes are held from the surface of the foil. On the completion of the revolution of the tape cycle cam 58, the motor 50 is de-energized.

The sequence of tape applying steps is shown schematically in FIGURES 8–12.

A spring return cut-off blade 70 is so disposed that the foil may be severed between its taped areas. Although the operation of the blade 70 may be automatic, it is found to be a feature of safety to actuate the blade 70 with the operator's finger to cut the foil.

The paper guide arm 79 is lifted to sever the paper strip, and the foil strip (carrying outer terminal tapes at its trailing edge) is wound in place manually to complete the coil. The trailing end portion of the foil strip with the outer terminal tapes applied thereto is folded perpendicularly to the length of the foil strip and parallel to the axis of core 74, as best seen in the view of FIG. 13, to thereby provide an outer terminal for the finished coil. The finished coil is then overwrapped or tack taped, to hold the turns in place, and removed from the shaft.

*The winding cycle*

The next operation of the machine commences with a winding cycle. Preparatory thereto, the free end of the foil supply strip (carrying inner terminal tapes from the preceding taping cycle) is presented to a new core 74.

In FIGURE 5, a section of the paper guide arm 79 is shown. There is an upper track 80 for channeling the kraft tissue paper and a roller 85 for directing the foil strip. While the guide arm is in an uplifted position (resulting from the preceding paper cutting operation), the foil is drawn onto the core. Then the inner terminal of the foil strip is formed by making a fold in the region covered by the terminal tape. This terminal will, therefore, extend laterally from the finished coil (see FIGURE 13).

Next, the guide arm is lowered to the position shown in FIGURE 1 so that the downwardly projecting flanges of roller 85 straddle the foil. The end of the kraft tissue paper drawn through the track 80, and the foil, are tacked onto the core by tacking tape from a tape dispenser 86. The proper length of tacking tape had been previously dispensed automatically, by operation of solenoid 112 which is energized concurrently with the energization of motor 94 (see FIG. 16a). Thus, the kraft tissue paper from the supply roll 84 is guided onto the core through the track 80 of the paper guide arm and, simultaneously, the foil is guided by the roller 85. This results in a centered relation of the foil and paper as they are drawn onto the core.

The kraft tissue paper provides insulation between adjacent turns of the foil. The paper may have a thickness, for example, of as little as 0.0005 inch and yet possess substantial electrical characteristics in insulating the turns of the foil. The width of the kraft tissue paper is preferably slightly wider than the width of the foil so that the overlap of the kraft paper provides assurance that no current path will be provided between the turns of the foil.

*The control system*

To initiate the turning of the shaft to form the interleaved strip conductor coil unit, a start switch 90 (FIG. 16a), which may be a foot operated switch, is closed so that alternating current applied to a plug 92 energizes a main or coil windup motor 94.

Referring to FIGURES 2 and 15, the motor 94 drives a pulley drum 96 by a connecting V-belt 98. The pulley drum is securely mounted on the shaft 46 so that as the motor 94 rotates, the shaft 46 also rotates.

As the shaft 46 rotates, the core 74 also rotates and the foil and paper are drawn through the guide 79 to form the coil unit. Also, the rotation of the shaft 46 is coupled by a timing bolt 45 to a gear reducer 100.

This reducer has, for example, a 50:1 ratio and its output shaft actuates a turn cycle cam 104. With a 1:2 ratio from shaft 46 to the reducer, and 1:1 gearing between the reducer output shaft and the shaft which carries cam 104, the cam will make one revolution for one hundred turns of shaft 46. When the start switch 90 is closed momentarily, the shaft 46 rotates sufficiently that the turn cycle cam 104 closes the micro-switch 106. Thereafter, rotation of the shaft 46 through the predetermined number of turns for forming the interleaved coil unit results in motor 94 being de-energized when switch 106 is reopened by the cam. Of course, various numbers of turns may be obtained in forming the interleaved coil through choice of the gearing arrangement between the reducer and the shaft of cam 104.

In circuit with the motor 94 is a potentiometer or auto-transformer device 110 for controlling the speed of the motor 94. Thereby, it is possible to control the speed of the shaft in forming the foil and paper into an interleaved unit. The rotation of the motor is typically controlled to 10,000 r.p.m., and the shaft 46 is thereby controlled to a speed of 3,500 r.p.m., since the speed of shaft 46 is stepped down in proportion to the pulley diameters of the shaft of motor 94 and of shaft 46, these two shafts being connected by drive belt 98, as best seen in the view of FIG. 2.

There are connected in parallel with the motor 94 a solenoid 112 to actuate the tack tape dispenser 86 and a solenoid 113 to actuate a counter which is actuated once for each complete cycle of operation to thereby indicate the total number of coils which have been wound. A similar arrangement may be used to actuate other single cycle devices with each cycle of machine operation.

A safety switch 116 is used to protect the operator of the machine from operation upon closure of the start switch 90 when the paper guide 79 is not operatively in place. A pilot lamp 117 is connected across the A.C. source, as shown, to indicate that the electrical circuit is ready for energization. A fuse 118 and main switch 120 are connected in series with the plug.

In order that there will be substantially no over-run of shaft 46, dynamic braking of motor 94 is employed. This is controlled by cut-out relay 125, which is energized concurrently with the motor. The relay is also energized upon actuation of the taping cycle since the motor 94 is not disengaged from shaft 46, and the dynamic braking would otherwise resist the operation of tape cycle motor 50. Furthermore, a mechanical (friction) brake 122 is employed to assure rapid braking. Friction brake 122 (FIG. 2) is in braking engagement with shaft 46 when brake solenoid 121 (FIGS. 2 and 16b) is deenergized, and is retracted out of braking engagement with respect to shaft 46 when brake solenoid 121 is energized. Therefore, whenever either of the motors 50, 94 is energized, brake solenoid 121 must be energized through control relay 124 to disengage the brake.

At the conclusion of a winding cycle, switch 106 is returned to its normally closed position, as shown in FIGURE 16, whereupon time delay relay 130 is energized and the taping cycle initiated automatically. Relay 130 and dwell control relay 140 are used to provide a time interval within which motor 94 and shaft 46 may be brought to a complete stop. After the time delay, power is applied to the brake solenoid 121, the cut-out relay 125 and motor 50.

In order to coordinate the placement of tape with the angular position of shaft 46, tape angle positioning solenoid 148 (see FIGS. 2 and 14) is also energized. Solenoid 148 includes a plunger 159 which is moved toward the solenoid (to the left with respect to the view of FIG. 14) when the solenoid is energized. Tape angle switch 150 is mounted on an arm 161 which is pivotally movable about pivotal support 149 intermediate solenoid 148 and cam 151 on shaft 46. A spring 155 attached to arm 161 below pivotal support 149 biases arm 161 and switch 150 against stop member 153. Movement of solenoid plunger 159 into the solenoid 148 is communicated to arm 161 through spring 157, so that when solenoid 148 is energized, plunger 159 through spring 157 causes movement of arm 161 in a clockwise direction about pivotal support 149, with respect to the view shown in FIG. 14, thus moving switch 150 ino the path of cam 151. This establishes a sensed orientation of the shaft 46, and switch 150 controls the application of power to magnetic clutch 152 (FIGURE 15). The operation of tape cycle unit 53 is thereby initiated. This is an important part of the timing arrangement, since it determines the location of spaced lengths of tape on the foil strip and guarantees the proper angular relationship of terminal leads in the finished coil.

Thus, although motor 50 is energized to start the taping cycle, the tape cycle unit is not actuated by clutch 152 until the shaft 46 is rotated to a predetermined position.

Once initiated, however, the taping operation proceeds to completion even after switch 150 is deenergized, due to the circuit holding action of control solenoid 156.

*Summary*

The machine provides an automatic winding operation, whereby the proper number of turns are formed. It also provides an automatic taping operation, whereby predetermined spaced lengths of terminal tape are applied at selected positions along the foil strip. In addition, the winding and taping cycles are so coordinated that variations in the stopping position of the winding shaft are compensated. This latter feature enables the machine to produce coils having not only the correct number of turns, but also a uniform angular relationship between the terminal leads of the finished coil.

The following is a brief summary of the mechanical operations of the apparatus and the relation of those operations to the taping and winding operations.

It should be understood that a complete cycle of operation of the machine, including a complete winding operation and a complete taping operation, involves the winding of a coil having a plurality of turns to the leading end of which insulated terminal tapes were applied in a previous taping cycle, and that at the completion of the winding of the desired number of turns in the given coil, a taping operation is performed which includes the placement of insulated tapes at the trailing end of the given coil which has just been wound, and also the placement of insulated tapes at a location on the advancing foil strip which will become the leading end of the next coil to be wound.

Let it be assumed that a coil has just been completely wound and has a terminal tape applied to the end thereof and that this completed coil has been removed from shaft 46. There remains a foil strip having terminal tapes affixed thereto during the previous taping cycle on the opposite surfaces of the leading end thereof to define the inner terminal of the new coil which is to be wound. The leading end of the foil strip, including the terminal tapes adhered thereto, is folded as best seen in FIG. 13 to project perpendicularly to the remaining length of the foil strip and parallel to the axis of the core 74 on which the remainder of the length of the coil is to be wound.

Guide arm 79 is then lowered so that the downwardly projecting flanges of roller 85 straddle the foil, and the end of the kraft tissue paper from supply roll 84 is drawn through the upper track 80 of guide arm 79. The foil and the kraft tissue paper are tacked onto core 74 by tacking tape from tape dispenser 86. Start switch 90 is then closed to energize coil wind-up motor 94. Rotation of motor 94 rotates shaft 46 on which core 74 is mounted, to thereby wind the foil strip and paper upon the core 74 to form the coil. Shaft 46 also drives timing belt 45 to drive gear reducer 100 whose output shaft turns a turn cycle cam 104. Timing belt 45, reducer 100, and cam 104 are so designed as to cause cam 104 to operate switch 106 to deenergize the circuit of motor 94 after a predetermined number of rotations of shaft 46, and therefore after a predetermined number of turns of the coil have been wound on core 74. Movement of turn cycle cam 104 to a position corresponding to the deenergized state of winding motor 94 also results in the actuation of time delay relay 130 and dwell control relay 140 to provide a time interval during which winding motor 94 and shaft 46 may be brought to a complete stop prior to the beginning of a new taping cycle. During this time delay interval, brake solenoid 121 is deenergized to release friction brake 122 to provide a frictional braking action on motor 94. Cut-out relay 125 is also deenergized during the time delay interval to electrically connect motor 94 for dynamic braking. After the end of the time delay provided by relays 130 and 140, brake solenoid 121 and cut-out relay 125 are energized to discontinue the mechanical and dynamic braking actions effected by these respective relays, and motor 50 which is used to rotate shaft 46 during the taping portion of the cycle is connected to electrical power.

Concurrently with the energization of motor 50, tape angle positioning solenoid 148 is also energized, thereby moving the pivotally mounted tape angle switch 150 against spring 155 into the path of movement of clutch cycle cam 151 on shaft 46. When the rise on cam 151 contacts tape angle switch 150, a circuit is completed to energize magnetic clutch 152 through a suitable holding circuit to connect tape cycle unit 53 (FIG. 2) to drive motor 50. Tape angle switch 150 thereby serves to initiate operation of tape cycle unit 53 at a predetermined definite angular position of shaft 46 to thereby insure the proper angular relationship of the inner and outer terminal leads of the finished coil. Tape cycle unit 53 includes tape cycle cams 54 and 58 which are driven from motor 50 as soon as magnetic clutch 152 is energized. Cams 54 and 58 respectively operate switches 55 and 56. During each revolution of tape cycle cam 54, switch 55 is actuated twice. On each actuation of switch 55, control valve solenoids 59 for tape air cylinders 60, 62, are energized to cause tape rocker arm assemblies 38 to rotate toward the foil strip. The first of the actuations of the air cylinders 60, 62, is effective to cause the tape rocker arm assemblies 38 to apply the outer terminal tapes to the coil which is being wound, while the second actuation of the air cylinders and tape rocker arm assemblies is effective to apply the tapes for the inner terminal of the next coil to be wound.

As the rocker arm assemblies 38 move toward the foil strip, each roller 65 rolls the leading end of its corresponding terminal tape into adhesive engagement with the foil. The foil and superposed terminal tapes then pass through pinch rollers 30 which apply pressure to insure that the tapes are firmly secured to the foil. Upon the deenergization of the valve solenoids 59 by the action of cam 58, the rocker arm assemblies 38 are retracted away from the path of the foil and in the retracting movement of the rocker arm assemblies, the terminal tapes are pulled against the hot wires 64, 66, to sever the ends of the terminal tapes which have just been adhesively attached to the advancing foil.

Switch 56 is actuated by cam 58 to provide a holding circuit for motor 50 and to energize hot wires 64, 66 during the taping portion of the cycle.

On the completion of the revolution of the tape cycle cam 58, motor 50 is deenergized to thereby stop the rotation of shaft 46 and core 74. A cut-off blade 70 may then be operated either manually or automatically to sever the foil strip between the successive terminal tapes so that the leading terminal tape of the two successive tapes becomes the outer terminal tape of the coil which has just been wound, while the second of the two successive terminal tapes becomes the inner terminal tape of the next coil to be wound. The paper guide arm 79 is lifted to sever the paper strip, and the foil strip carrying the outer terminal tape at its trailing edge is wound in place manually to complete the coil. The trailing end of the foil strip, including the terminal tapes adhered thereto, is folded as best seen in FIG. 13 to project perpendicularly to the remaining length of the foil strip and parallel to the axis of the core 74. The finished coil is then overwrapped or tack taped to hold the turns in place and is removed from shaft 46, thereby completing the formation of the coil.

While the present preferred embodiment of the invention has been illustrated and described, it will be recognized that the invention may be otherwise variously embodied and practiced within the scope of the following claims.

I claim:
1. The method of forming a wound coil having interleaved turns of an insulating material and a conductive material, and terminal leads extending laterally therefrom at predetermined angular positions, comprising the steps:
  (a) Applying a length of insulative tape to each side of the leading end of a foil strip;
  (b) Folding said strip laterally and substantially perpendicularly to the length of said strip to form an inner terminal lead;
  (c) Attaching the foil strip and a contiguous strip of the insulating material to a core member;
  (d) Rotating said core member through a predetermined angular travel;
  (e) Applying a length of insulative tape to each side of the foil strip at a controlled position relative to said inner terminal lead;
  (f) Severing the foil strip, whereby a taped trailing end thereof is provided;
  (g) Completing the final turn of said coil by winding the taped trailing end into place;
  (h) Folding said strip laterally and substantially perpendicularly to the length of said strip to form an outer terminal lead extending substantially parallel to the axis of said core; and
  (i) Overwrapping the coil to hold the turns of foil and paper in place upon the core; whereby said inner and outer terminal leads of the coil are maintained in the desired angular relationship.

2. The method of forming a wound coil having interleaved turns of an insulating material and a conductive material, and terminal leads extending laterally therefrom at predetermined angular positions, comprising the steps:
  (a) Applying spaced lengths of insulative tape to a foil strip;
  (b) Severing said strip at a position intermediate said tapes, whereby a taped leading end of the strip is provided;
  (c) Folding said strip in the area of the tape laterally and substantially perpendicularly to the length of said strip, to form an inner terminal lead;
  (d) Attaching the leading end of said taped foil strip and the insulating strip to a core member;
  (e) Rotating said core member to form the coil;
  (f) Again applying spaced lengths of insulative tape to the foil strip, at a position predetermined relative to said first-applied tapes;
  (g) Severing said strip between said second-applied tapes, whereby a taped trailing end of the strip is provided;
  (h) Completing the final turn of said coil by winding the taped trailing end into place;
  (i) Folding said strip in the area of the tape laterally and substantially perpendicularly to the length of said tape and substantially parallel to the axis of said core to form an outer terminal lead; and
  (j) Overwrapping the interleaved turns of foil strip and insulating strip.

3. The method of claim 2 wherein step (e) comprises rotating the core rapidly through a predetermined total angular travel; and step (f) comprises (1) affixing the leading end of a supply of insulative terminal tape to the foil at a predetermined position relative to said inner terminal lead, (2) advancing the foil with insulative tape in superposed relation thereto while applying pressure to firmly adhere the insulative tape to the foil, and (3) severing the length of tape from its supply.

4. The method of claim 3 wherein step (3) is accomplished by pulling the tape against a heated cutting element.

References Cited by the Examiner

UNITED STATES PATENTS

| 2,547,644 | 4/1951 | Hogue et al. | 242—56.1 |
| 2,675,188 | 4/1954 | Larson | 242—56.1 |
| 2,710,441 | 6/1955 | Heyman | 242—56.1 |
| 2,961,747 | 11/1960 | Lyman | 29—155.57 |

FOREIGN PATENTS

| 636,396 | 2/1962 | Canada. |

EARL M. BERGERT, *Primary Examiner.*